United States Patent [19]

Klossner et al.

[11] Patent Number: 6,017,576

[45] Date of Patent: Jan. 25, 2000

[54] METHOD OF PREPARING TEXTURIZED PROTEIN FOOD PRODUCT

[75] Inventors: Gerald H. Klossner, Austin; Danny V. Janecka, Waelder; Pat L. Poehl, Austin, all of Tex.

[73] Assignee: Old Mexico Manufacturing, Inc., Austin, Tex.

[21] Appl. No.: 08/854,228

[22] Filed: May 9, 1997

Related U.S. Application Data

[63] Continuation-in-part of application No. 08/628,873, Apr. 5, 1996, abandoned.

[51] Int. Cl.[7] ............................... A23J 1/00; A22C 1/10
[52] U.S. Cl. ..................... 426/656; 426/511; 426/513; 426/802
[58] Field of Search .................................. 426/656, 513, 426/511, 802

[56] References Cited

U.S. PATENT DOCUMENTS

| Re. 28,091 | 7/1974 | Heusdens et al. . |
|---|---|---|
| 2,967,773 | 1/1961 | Anderson . |
| 3,275,452 | 9/1966 | Allen . |
| 3,754,926 | 8/1973 | Strommer et al. . |
| 3,797,376 | 3/1974 | Meyer et al. . |
| 3,863,019 | 1/1975 | Strommer . |
| 3,917,860 | 11/1975 | Ayres et al. . |
| 3,965,259 | 6/1976 | Coppage et al. . |
| 3,991,221 | 11/1976 | Waggle et al. . |
| 4,128,051 | 12/1978 | Hildebolt . |
| 4,200,041 | 4/1980 | Hildebolt et al. . |
| 4,702,924 | 10/1987 | Owens et al. . |
| 4,781,939 | 11/1988 | Martin et al. . |
| 4,844,933 | 7/1989 | Hsieh et al. .............................. 426/521 |
| 4,910,040 | 3/1990 | Sagarino et al. . |
| 4,947,518 | 8/1990 | Covell, III . |
| 4,963,370 | 10/1990 | Uchida et al. . |
| 5,063,073 | 11/1991 | Kratochvil . |
| 5,068,117 | 11/1991 | McCabe . |
| 5,083,506 | 1/1992 | Horn et al. . |
| 5,113,755 | 5/1992 | Anderson et al. . |
| 5,228,775 | 7/1993 | Horn et al. . |
| 5,281,432 | 1/1994 | Zallie et al. . |
| 5,410,951 | 5/1995 | Ledet et al. . |

OTHER PUBLICATIONS

"Continuous Steam Cooking of Ground Meat", *Fresh Meat Technology*, Karmas, Endel; Noyes Data Corporation (1975); p. 272.

"Hamburger–Like Product From Ground Poultry and TVP", *Commercial Processing of Poultry*, Weiss, G.H.; Noyes Data Corporation (1976); pp. 229–230.

"Cooking with Steam —Comminuting and Cooking of Raw Meat Used for Precooked Sausage", *Sausage Products Technology*, Karmas, Endel; Noyes Data Corporation (1977); pp. 231, 234.

*Primary Examiner*—Anthony J. Weier
*Attorney, Agent, or Firm*—Jackson Walker LLP

[57] ABSTRACT

A method and apparatus, the method for cooking an untexturized, moisture-carrying protein product with an apparatus, including a vessel having a tub portion and a lid, with blenders and steam injectors in the tub portion, the tub portion being jacketed and the apparatus includes a device for generating steam, a device for energizing the blenders, and a device for drawing a vacuum in the vessel. Utilizing the apparatus, applicants provide a unique method of putting the untexturized protein product in the tub of the vessel followed by simultaneously heating the product with steam injection while blending until the product becomes texturized. Following the cooking step, the product is simultaneously cooled while sufficient vacuum is drawn to boil off at least some of the moisture.

18 Claims, 4 Drawing Sheets

METHOD OF PREPARING TEXTURIZED PROTEIN FOOD PRODUCT

This application is a continuation-in-part of U.S. application Ser. No. 08/628,873 filed Apr. 5, 1996 now abandoned.

FIELD OF THE INVENTION

This invention relates to a method for the treatment of untexturized protein materials to form a texturized protein product. More specifically, this invention relates to a method of cooking an untexturized, paste-like, moisture-carrying protein product, such as mechanically deboned, comminuted poultry, by simultaneously heating the untexturized protein product through steam injection while mixing the product, until it becomes texturized with the consistency of cooked ground beef or ground pork.

BACKGROUND OF THE INVENTION

An important aspect of the present invention is employing a cooking method which converts an untexturized protein product into a texturized protein using a single cooking vessel. Particularly, the present invention provides a cooking method for an untexturized, paste-like, batter-like protein product with no visible grain or texture into a texturized, coarse, crumbly, protein product with a definite shape having the consistency of cooked ground meat.

The term texture describes a wide variety of physical properties of a food product. A product of acceptable texture is usually synonymous with the quality of a product. Texture has been defined as "the attribute of a substance resulting from a combination of physical properties and perceived by senses of touch, including kinaestheses and mouth feel, sight, and hearing. Texture, as defined by the International Organization of Standardization, is "all of the Theological and structural (geometric and surface) attributes of a food product perceptible by means of mechanical, tactual and, where appropriate, visual and auditory receptors." The following terms have been used to describe product characteristics falling under the umbrella "texture":

TABLE I

ABRIDGED LIST OF FOOD TEXTURE ADJECTIVES

| | | | |
|---|---|---|---|
| Adhesive | Fleshy | Mushy | Soft |
| Bouncy | Fluffy | Oily | Soggy |
| Brittle | Foamy | Pasty | Sparkly |
| Bubbly | Fragile | Plastic | Splintery |
| Chewy | Full-bodied | Porous | Spongy |
| Clingy | Gooey | Powdery | Springy |
| Coating | Grainy | Puffy | Sticky |
| Cohesive | Gritty | Pulpy | Stringy |
| Creamy | Gummy | Rich | Syrupy |
| Crisp | Hard | Rough | Tender |
| Crumbly | Heavy | Rubbery | Thick |
| Crusty | Heterogenous | Runny | Thin |
| Dense | Juicy | Sandy | Tingly |
| Doughy | Lean | Scratchy | Tough |
| Dry | Light | Short | Uniform |
| Elastic | Limp | Silky | Viscous |
| Fatty | Lumpy | Slippery | Watery |
| Firm | Moist | Slivery | Waxy |
| Flaky | Mouth coating | Smooth | Wiggly |

Accelerated attention has been given to texture as it pertains to newer food substances including fabricated and imitation products, formed meat and fish products, where very serious efforts are made by processes to duplicate the properties of the original or other natural food substances. The use of non-traditional raw materials, synthetic flavors, fillers, and stretchers all tend to alter certain textural characteristics of the finished product. Frequently, the imitation of textural properties is of much greater difficulty in the replication of taste, odors, and colors. Numerous manipulative processes, including extrusion texturization, have been developed to simulate natural textural properties. The processes generally find it prudent to duplicate the properties of the original substances to the extent feasible technically and economically in order to promote early market acceptance. While texture has attributes related to appearance, it also has attributes related to touch and also mouth feel or interaction of food when it comes in contact with the mouth. Frequently, these sensory perceptions involved with chewing can relate to impressions of either desirability or undesirability.

Thus, textural terms include terms relating to the behavior of the material under stress or strain and include, for example, the following: firm, hard, soft, tough, tender, chewy, rubbery, elastic, plastic, sticky, adhesive, tacky, crispy, crunchy, etc. Second, texture terms may be related to the structure of the material: smooth, fine, powdery, chalky, lumpy, mealy, coarse, gritty, etc. Third, texture terms may relate to the shape and arrangement of structural elements, such as: flaky, fibrous, stringy, pulpy, cellular, crystalline, glassy, spongy, etc. Last, Texture terms may relate to mouth feel characteristics, including: mouth feel, body, dry, moist, wet, watery, waxy, slimy, mushy, etc.

As used herein, "untexturized" and "texturized" describe the characteristics of the food product as set forth in Table II:

TABLE II

| | Untexturized Characteristic | Texturized Characteristic |
|---|---|---|
| Behavior of Material under Stress or Strain | sticky gooey plastic | firm chewy |
| Structure of Material | smooth | coarse |
| Shape and Arrangement of Structural Elements | gelatinous pulpy pasty | fibrous crusty |
| Mouth Feel | creamy mushy | moist dry with body |

It is well known in the art to produce mechanically separated poultry using high-pressure machinery that separates bone from tissue, by first crushing bone and adhering tissue and then forcing the tissue, and not the bone, through a sieve or similar screening device. The process forms an untexturized, paste-like blend of soft tissue with a batter-like consistency.

The prior art methods then cook the paste-like blend and any additives with some agitation to form globs of protein, resembling pieces of liver. These globs are then run through a grinder to obtain a texturized meat product. Texturized meat made from this process suffers from lack of uniform consistency caused by shearing of the protein through the blades of the grinder.

The process of the present invention also utilizes the untexturized, paste-like blend of soft tissue as the starting material; but rather than heat the untexturized blend in a pot, as the prior art does, the inventive process places the untexturized, paste-like blend in a jacketed tub and mixes the blend. During mixing, the untexturized, paste-like blend is in direct contact with injected steam. The inventive process results in a texturized protein product with a more uniform consistency than the product of the prior art, because no shearing mechanism (such as grinding) is involved. The present method provides a definite advantage over the prior art method by eliminating the grinding step, which is necessary when using the prior art method, and utilizing heating by direct contact with steam. The present method also allows a crust to form on the outside surfaces of the protein as it is blended in direct contact with the injected steam.

Utility of the present invention lies in the use of untexturized, paste-like, moisture-carrying protein products, such as comminuted, emulsified or finely ground chicken, lamb, beef, pork, turkey or poultry, to form such useful texturized food products such as taco filler, spaghetti sauce, pizza topping, chile, or the like. Economic gain can be found in providing an inexpensive method of converting comminuted chicken, turkey or poultry, initially in the form of paste, having a batter-like consistency, with little or no visible grain or texture, into a protein product, having the texture of cooked loose hamburger meat. Such product may then be used in a number of prepared foods.

A patent addressing similar objectives is U.S. Pat. No. 4,128,051 (Hildebolt, 1978). The Hildebolt patent discloses a process and apparatus for texturizing vegetable protein to produce discreet pieces of puffy, irregularly shaped protein matter simulating natural meat. The '051 patent discloses a method comprising continuously extruding a tubular shell of semi-rigid, bland protein material into a confined treatment zone; injecting a heated gaseous steam into the interior of the tubular shell as it enters the confined treatment zone to blow the tubular shell into discreet pieces of irregularly shaped protein material; and recovering the texturized protein product. The apparatus utilized in the '051 method for texturizing protein comprises means for continuously extruding a tubular shell of semi-rigid protein dough material into a confining treatment zone; means for injecting a heated gaseous steam into the interior of the extruded tubular shell as it enters the confined zone to blow the shell into discreet pieces of irregularly shaped protein material; and means for recovering the texturized protein material. The Hildebolt patent utilizes a method and apparatus requiring an extrusion die for injecting steam into the interior of the tubular shell.

Other patents which disclose methods for preparing cooked, textured poultry products include U.S. Pat. No. 3,917,860, which discloses a cooked poultry product having the appearance and characteristics of cooked ground meat. The product is prepared by blending raw, comminuted poultry in a textured, vegetable protein and cooking the resultant mixture in a broth. The '860 patent points out the utility of utilizing comminuted chicken products, especially as a substitute for pork and beef products, for use in preparations such as chile, pizza, and spaghetti sauce. The '860 patent also discloses a method of preparing a cooked chicken food product, 70 parts by weight of broth and comminuted chicken blended with 15 parts by weight of unhydrated textured vegetable protein, with the resultant mixture cooked at 170° F. to 212° F. with water, beef bullion, beef stock or salt water. The product is then cooled to provide a cooked, textured chicken product, which is free of any chicken flavor. The resultant product is suitable as a replacement for cooked, chopped beef and various food dishes.

The mixture disclosed in the '860 patent is cooked using a "thermascrew". A steam jacket surrounds a cylinder containing a continuous helical web on a rotating screw. The temperature is kept about 170° F. to 212° F., while the cooked meat exits the thermascrew at about 180° F. Alternatively, the broth cooking can be carried out by batch processing in a suitable kettle at a temperature from about 170° F. to 212° F.

None of the patents, however, disclose a method of simultaneously mixing and heating comminuted chicken to form a texturized product. Following the formation of the textured product by heating, the moisture content may be reduced by pulling a vacuum over the product, causing it to boil off moisture until the desired moisture content is reached.

SUMMARY OF THE INVENTION

The present invention provides a unique method utilizing an apparatus, the method including cooking an untexturized, paste-like, moisture-carrying protein product in an apparatus including a vessel having a tub portion and a lid, with blenders and steam injectors in the tub portion, the tub portion being jacketed and the apparatus also including means for generating steam, means for energizing the blenders, and alternately, means for drawing a vacuum in the vessel. Utilizing such an apparatus, applicants provide a unique method including the steps of putting the untexturized, moisturized protein product in the tub of the vessel followed by simultaneously heating the product with steam injection while blending until the product becomes texturized. Following the heating step, the product, if moisture reduction is required, is simultaneously cooled while a vacuum is drawn sufficient to boil off at least some of the moisture.

The machine used in the process is a horizontal meat blender. It is constructed of stainless steel and has the general configuration of a double U, with the center meeting point of the "U"s reduced in height to allow crossover of the meat columns. This design is not critical to the process, as it will also function in a single column horizontal mixer, with appropriately designed mixer blade shafts installed or other designs. The mixer currently used has twin shafts running the length of the mixer body. These shafts are connected through a gear drive to two electric drive motors. The drive motors are connected to an inverter which allows variable speed operation. In normal configuration, the shafts turn in opposite directions, causing the meat columns to move in opposing directions, creating a "racetrack" effect, with some crossover mixing in the reduced height center. The motors are capable of being completely reversed, causing a counterflow "racetrack" effect. In actual operation, the flows are periodically reversed to insure that all portions of the meat columns cross the flow of the steam streams. The shafts are mounted in bearing seals, the composition of which is determined by the anticipated use (i.e., a vacuum or atmospheric pressures).

The steam injectors used in the process are of the "pop-it" type. This is a steam valve that, when steam pressure is applied, "pops" downward, thereby allowing the passage of the live steam through the injector.

It is important that the steam from the injectors is in direct contact with the untexturized, paste-like, protein product during blending. The injectors are preferably mounted in the bottom of the mixer to allow gravity to maintain contact of the moving meat mixture with the injector steam stream. The process can also be effected if the injectors are placed along the sides of the mixer vessel, as long as the blended protein product is in direct contact with the steam. It is unlikely that the process would function properly with injectors mounted vertically above the product, as there would be no mechanism available to cause the moving column of meat to contact injectors so mounted. Steam pressures of 15 psi to 30 psi may be used. This equates to steam temperatures at sea level of 213° F. to 250° F. The steam pressure used is not critical to the process, but is a component of the process which may be balanced by the speed of movement of the meat column.

There are three (3) typical shaft configurations used in horizontal meat mixers, i.e., solid screw, ribbon screw, and paddles. All of the shaft configurations have been tested, and the process works with all types. It has been determined, however, that the ribbon screw is preferable and allows the reversal of the usual opposing shaft for unloading purposes (i.e., both shafts pushing the product to the exit openings).

All finished products have preselected, desired moisture contents. The use of steam injection results in water being added to the products during the injection stage (i.e., the steam condensed by striking the meat column). In a number of the products, this additional water hydrates dried materials present in the product mix; and, in fact, some of the products require additional water to be added at the end of the cooking process. However, some products require a reduction of moisture content. This may be achieved under atmospheric conditions by application of conduction heating, using the steam jacket of the mixer (if so equipped) or by transfer to another steam-jacketed vessel (mixer or kettle).

The preferable method of moisture reduction is by the use of vacuum drying. The mixer is equipped with a vacuum lid or hood which allows the vessel to be sealed. The hood is attached by hose to a waterseal vacuum pump, preceded by a heat exchanger. In operation, a vacuum is drawn in the mixer; and, as the pressure reduces, the heat contained in the product is sufficient to "flash" off some of the moisture in the product (i.e., water boils at lower temperatures with reduced pressure). Should the heat content of the product be insufficient to remove the desired quantity of moisture, additional heat input may be achieved by use of the mixer steam jacket. The heat exchanger is used to cool the moisture/air mixture entering the vacuum pump, as pump efficiency is greatly reduced by heated air.

Increases in product temperature may be achieved by the application of direct steam injection, or by use of steam jackets. However, the initial temperature rise (i.e., up to temperature for protein fixation, about 145° F. to 150° F.) should be obtained by direct steam injection for optimal process function. The remainder of the cooking process (i.e., heating product to approximately 180° F.) may be achieved using either direct steam injection or the steam jacket, the method used being determined by the desired final moisture content of the product. If additional moisture is needed, direct steam injection should continue. If sufficient or excess moisture is present, final cooking should be performed using the steam jacket.

It is desirable to reduce the product temperature after final cooking to a level tolerated by the packaging materials to be used (typically about 140° F.). This may be achieved atmospherically or under vacuum. If done atmospherically, cold water is circulated through the vessel steam jacket while the product is agitated by rotating the vessel shafts. However, efficient cooling may also be achieved by balancing the heat input provided by the cooked product and/or the vessel steam jacket with the temperature reduction caused by the evaporation of moisture under vacuum (i.e., 970.4 BTU per pound of water evaporated). In actual operation, the vacuum level/heat content or heat-added level is balanced by automatically or manually valving to achieve a rate of cooling equal to the rate of desired moisture removal, so that the desired product moisture content is reached at the same time as the desired product packaging temperature.

The present method converts an untexturized, paste-like protein product into a texturized, ground, cooked meat consistency, protein product. This method can be improved by adding particulate matter when the untexturized product is placed in the vessel. It appears that the texturization formation and setting of the texturized protein product is enhanced by contact with the particulates in a product mixture. The protein setting appears to cling to and forms a shell around the particulate matter, and is aided by its presence. The composition of the matter, i.e., textured vegetable protein (TVP), dehydrated onion, dehydrated potato, coarse ground or chopped spices, etc., does not appear to be critical, although TVP and dehydrated onion are preferred. However, it does appear that a superior product is produced by the presence of such particulate matter.

The binding of meat pieces, regardless of size, is a heat-initiated reaction, since no binding occurs in the raw, uncooked state. It has been suggested that heating causes the previously dissolved proteins to rearrange, causing interaction with the insoluble proteins on the meat surface and, in doing so, form a cohesive network structure. The passage of the moving meat column across the steam stream front may produce this effect.

Certain material will also cause proteins to denature (i.e., lose their ability to form a cohesive network structure). Some of the most active of such materials are those containing organic acids (tomato, vinegar, etc.) Since the process includes the formation of a cohesive network structure, the addition of such materials would typically inhibit such formation. Accordingly, a part of the process is that such denaturing materials are not added to the product mix until after the protein binding has occurred. In actual practice, this is achieved by not adding possible denaturing materials during the application of steam heat until a temperature of about 150° F. has been achieved.

The process is not dependent on a particular speed of movement of the meat column across a particular steam stream front. The texturing effect typically occurs to a lesser or greater degree, so long as the column of meat is moving across a steam stream. In operation, the size of meat particles produced may be controlled by increasing (decreasing the particle size) or decreasing (increasing the particle size) the speed of movement of the meat column across the steam stream. Similar, but less precise changes may be made by variation of steam pressure/flow. As a practical matter, it is easier to control the meat column movement by use of variable speed/reversing motors than attempting to alter the process by steam pressure flow adjustments.

EXAMPLE OPERATION

Mechanically deboned meat (MDM), for example, chicken, is placed in the bottom of a steam-injected, steam-jacketed vacuum mixer. The quantity of spices and other non-denaturing material called for by the product formulation is placed into the mixer with the meat. The mixer is typically operated to achieve a complete mixture of the meat/spices and materials. The proper mixer shaft speed setting/shaft reversal setting for the desired meat partial size is set, and agitation commenced. Steam injection is commenced and continued until an internal meat temperature of 150° F. is achieved. Any denaturing materials are then introduced into the mixture. Depending on the desired ultimate moisture content of the finished cooked product, heating is continued by steam jacket or steam injection to a temperature of 180° F. Heat flows are then terminated. Product moisture content is determined. Water is added, if necessary. If additional water is added, product cooling to packaging temperature can be achieved by circulation of cold water through the mixer steam jacket, or by the addition of enough excess water to allow vacuum drying/cooling. If a moisture reduction is required, vacuum drying/cooling is commenced, and continued until the desired moisture/packaging temperature is achieved.

DETAILED DESCRIPTION OF THE PREFERRED EMBODIMENT

Figure 1:
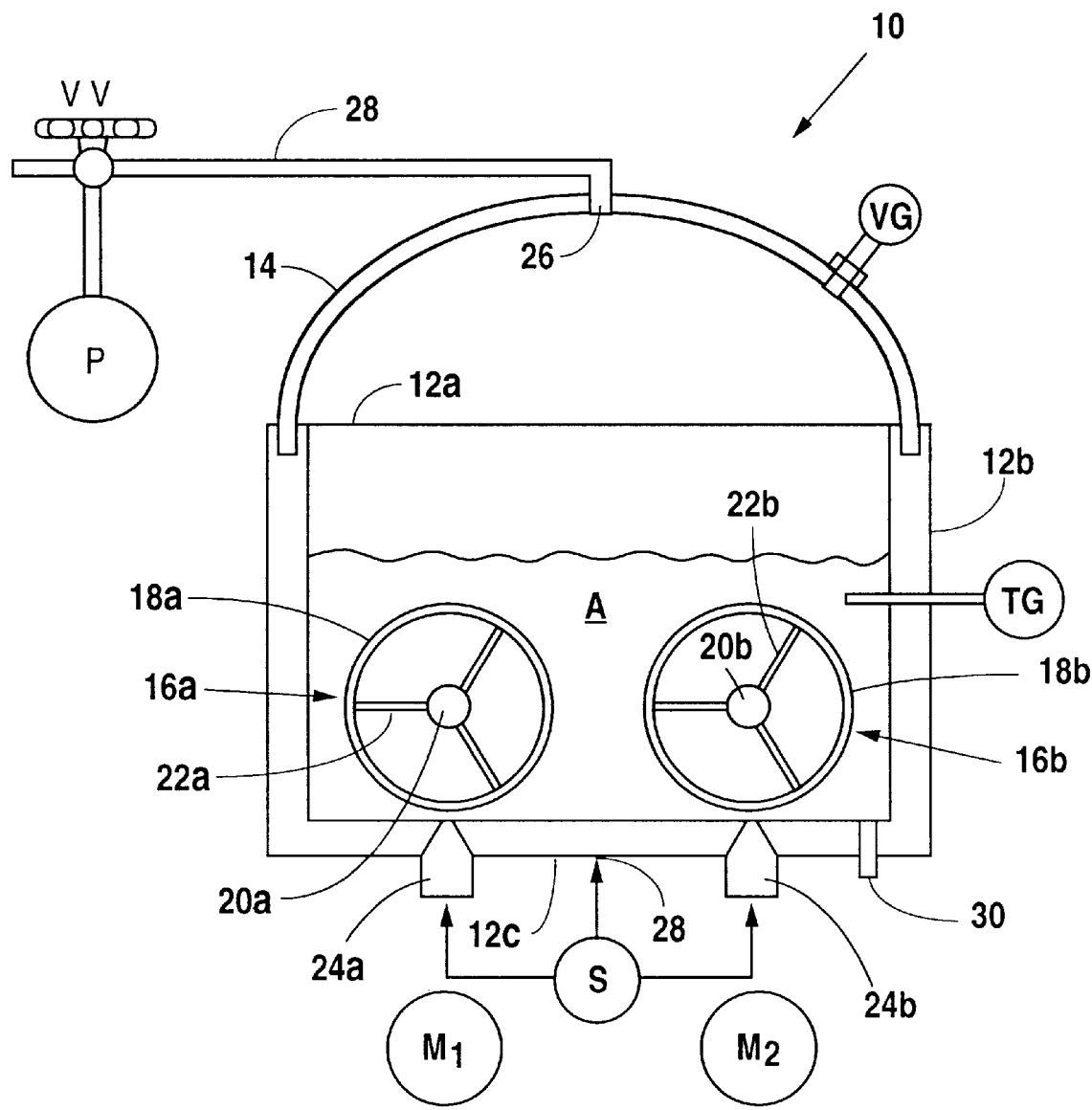
FIG. 1 is a is a perspective view of the preferred embodiment of the apparatus utilizing applicants' unique method.

FIG. 1 illustrates the apparatus of applicants' present invention. The apparatus includes a large vessel (10), made up of a fluid tight tub (12), having an upper top opening (12a), jacketed walls (12b), including bottom walls (12c) and a lid (14), the lid capable of sealing in air tight enclosed within the interior of tub (12) are located agitators, typically appearing as a pair, such as agitators (16a) and (16b) illustrated in FIG. 1. The agitators are typically comprised of ribbons (18a) and (18b), helically wound and attached to two drive shafts (20a) and (20b) through the use of spokes (22a) and (22b). Product (A) when placed in tub (12) will be mixed when agitators (16a) and (16b) are energized.

Steam injection jets (24a) and (24b), are typically mounted to inject steam into product (A) through bottom walls (12c), with the steam being generated by steam generation means (S). Drive shafts (20a) and (20b) are typically driven by electrical motors, here illustrated as (M1) and (M2).

The lid of the vessel includes a port (26), for engaging a vacuum pump (P) through tubes (28), the vacuum pump (P) generates a vacuum which may be controlled through vacuum valve (VV). The temperature of product (A) can be monitored through the use of temperature gauge (TG), the vacuum may be monitored through the use of vacuum gauge (VG). Steam may also be provided from steam generation means (S) to jacketed walls (12b) through steam port (28). Jacketed walls (12b) are vented, here at vent (30).

Applicants' novel method cooks comminuted chicken through the use of steam injection, while mixing it through the use of blending means, such as rotating agitators (16a) and (16b). Steam is injected at between about 15 to 25 pounds of pressure (about 214° F. to 240° F.) as mixing occurs, heating product (A) to approximately 180° F. (preferred range 175° F. to 200° F.). At above about 140° F., texturization of product (A) begins to occur. The 180° F. upper temperature is preferred for killing pathogenic bacteria. After the upper temperature is reached, the step of moisture reduction (if required) commences. Moisture is boiled off, resulting in a texturized meat product with a moisture content of 58% to 64% by weight; however, some products can have as low as 40% moisture content (for example, precooked chorizo or sausage which crumbles after cooking).

Steam heat must be applied at the proper pressure. Steam pressure too high will blast the product (A) apart (pressure above about 30 psi). Steam pressure too low will not properly texturize the product (pressure below about 9 psi).

An appropriate machine to be used in practicing the process of the present invention has been produced by Blendtech Corporation of Santa Rosa, Calif. as Model No. BN-10028-JDB. The Blendtech double agitating blender/mixer has dual ribbons, each about 10 inches in diameter and 28 inches long, that typically rotate opposite each other (i.e., one rotates clockwise and the other rotates counterclockwise). Each drive shaft is driven by a variable speed, one horsepower electric motor. The capacity of the tub utilized for the following examples is approximately 150 pounds (volume: approximately 3 cu. ft.). It comes equipped with a thermocouple for measuring the temperature of the product (A) as it is heated. The motors typically drive the ribbons between 0–35 rpm. Two steam jets (one on each side) are activated through the use of "pop-it" valves. This Blendtech mixer with bottom injection of steam has been used previously for heating sauces and soups, as well as for cooking sausage.

EXAMPLE 1

The Blendtech machine described above was filled with comminuted chicken, untexturized, in the form of a paste, having a batter-like consistency. Comminuted chicken includes salvaged protein from mechanically deboned chicken. The untexturized protein product began with a 68 to 70% moisture content (which figure includes 0–2% salt). The remainder of the beginning product included about 12–15% fat, the rest being protein and ash, as well as some residual calcium from the deboning process. About 65 pounds of comminuted chicken was shoveled into the tub and filled to several inches above the top of the ribbons. About 2.2 pounds of ground beef was added for color along with about 1.3 pounds of dehydrated onions, 2.2 pounds of textured vegetable protein (TVP), and about 6.5 pounds (dry) of blended spices.

A first blending step was performed by energizing the agitators for about 3 to 5 minutes, until visual observation indicated the chicken, beef, TVP, onion, and spices have been thoroughly mixed. The lid was then shut and clamped down and the ribbons started at a rotation rate of 11 to 12 rpm. The product, initially being at ambient temperature, was subject to steam injection at about 23 psi (235° F. to 240° F. at ambient pressure) for 15 and 25 minutes to take the mixture up to about 180° F. During this second blending cycle, cooking and forming (texturization) occurred with steam adding moisture to the product, typically up to about 68% moisture content. During this second blending, occasional reversing of the motors every 1 to 10 minutes was performed to break off the build-up of product on the ribbons. It is noted that, at above about 140° F., the product turns from jellied protein to texturized particles as the steam breaks up the untexturized paste into particles onto which a surface shell of protein forms.

It is noted that the initial starting product may be seeded with about 2 to 2.2 pounds of TVP. Following the heating cycle, which raised product temperature to 180° F. to kill bacteria, a vacuum was pulled while steam heat was added to the jacketed walls. This step results in cooling and dehydrating. Applying a vacuum will allow the moisture to boil off at temperatures at or below 180° F. However, heat may be added so as not to cool the product at too great a rate. Heat should be added to the steam jacket and the vacuum should be controlled to allow dehydration of the product to a final moisture content between 40% and 64% (preferably 58%) while preferably maintaining the entire mixture at a temperature of about 140° F. or greater.

Most MDM chicken has 1% to 2% by weight of salt blended into it at the time of manufacture, as well as 175% nitrite "cure". The process works with MDM chicken so blended, however, the "cure" causes the resulting textured meat to have a red tint, which may not be acceptable to consumers in some applications. Best results with the process have been achieved using MDM chicken that has not been blended with salt and cure. The product created by the process when using the unsalted/uncured MDM chicken is indistinguishable from cooked ground beef.

Automated control of the vacuum and/or application of steam heat to the jacket may be performed using a programmable logic controller and appropriate sensors/activators to reach or maintain the mixture at between 140° F. and 180° F. while boiling off water to reach the desired moisture content. With the vessel mounted on sensitive scales to allow the measure of the weight loss during the dehydration process (which measures weight loss) and knowing the other variables, such as weight of the product and moisture content at the start of the operation, this allows for the determination of the appropriate moisture content of the final cooked product by determining a desired weight loss, that is, the controller would sense product weight to determine equivalent moisture content and adjust the vacuum or steam heat to reach the desired final value, given measured values at the start of the cooling process.

Following the dehydration process, the now texturized product is packed, typically at about 140° F. to 180° F. out of a vertical form fill machine. It is to be noted that, during the vacuum/dehydration process, it helps to occasionally reverse the blenders to expose more product to the surface and ensure uniform dehydration. Typically, vacuum is drawn to 22 to 26 inches (at 400 ft msl) The steam jacket carries steam at about 15 psi during the vacuum/dehydration process.

Example 1 yielded a texturized product with a moisture content of about 54%. The remaining 46% was approximately 14% protein, 24% spice and 9% fat (weight percentages).

PRODUCTS MADE

In summary, the following products were made with applicants' method:

| PRODUCT I: Picadillo | |
|---|---|
| INGREDIENTS: | (% by weight) |
| MDM Chicken | 44.88 |
| Diced Tomatoes | 30.82 |
| Water | 10.87 |
| Dehydrated Potato | 4.82 |
| Dehydrated Onion | 2.12 |
| 90 Beef | 1.53 |
| TVP | 1.52 |

| PRODUCT I: Picadillo | |
|---|---|
| INGREDIENTS: | (% by weight) |
| Beef Base | .85 |
| Salt | .64 |
| Vinegar | .54 |
| Tomato Paste | .36 |
| Dried Chipotle Pepper | .27 |
| MSG | .27 |
| Cumin | .18 |
| Granulated Garlic | .16 |
| Dried Cilantro | .12 |
| Dehydrated Bell Pepper | .03 |
| | 100.00 |

PROCEDURE

The beef is ground through a 3/16 inch plate. All of the ingredients, except the diced tomatoes, tomato paste, vinegar, and water are placed in a blender and mixing is commenced. When the mixture is well blended, steam is introduced into the mixture. Steam injection is continued until an internal temperature of about 150° F. is achieved. Steam injection is then terminated. If the blender lacks a steam jacket, the product is transferred to a steam jacketed mixing vessel. The diced tomatoes, tomato paste, and vinegar are added. Mixing is commenced and steam flow through the jacket is commenced. Mixing and heating are continued until an internal temperature of 180° F. is achieved. Moisture content is determined and adjusted by adding water. The product is cooled to under 140° F. by passage of cold water through the vessel jacket and/or vacuum cooling. The product is pumped to a vacuum packing machine, where it is vacuum packaged and labeled. The packaged product is chilled to below 40° F. and boxed.

| PRODUCT II: Taco Filling | |
|---|---|
| INGREDIENTS | (% by weight) |
| MDM Chicken | 77.28 |
| Water | 5.64 |
| 90 Beef | 2.64 |
| TVP | 2.63 |
| Dehydrated Onion | 2.07 |
| Paprika | 1.83 |
| Sugar | 1.56 |
| Chili Powder | 1.34 |
| Salt | 1.10 |
| Onion Powder | .89 |
| Food Starch | .72 |
| MSG | .68 |
| Cumin | .47 |
| Granulated Garlic | .45 |
| Beef Base | .45 |
| Cayenne Pepper | .14 |
| Oregano | .06 |
| Dehydrated Bell Pepper | .03 |
| | 100.00 |

PROCEDURE

The beef is ground through a 3/16 inch plate. All of the ingredients, except water, are placed in a blender and mixing is commenced. When the mixture is well blended, steam is introduced into the mixer. Steam injection is continued until an internal temperature of 150° F. is achieved. Steam injection is then terminated. If the blender lacks a steam jacket, the product is transferred to a steam jacketed mixing vessel. Mixing is commenced and steam flow through the jacket is commenced. Mixing and heating are continued until an internal temperature of 180° F. is achieved. Moisture content is determined and adjusted by further heating and/or vacuum drying. The product is cooled to under 140° F. by passage of cold water through the vessel jacket and/or vacuum cooling. The product is pumped to a vacuum packing machine, where it is vacuum packaged and labeled. The packaged product is chilled to below 40° F. and boxed.

PRODUCT III: Pasta Sauce with Meat

| INGREDIENTS | (% by weight) |
|---|---|
| MDM Chicken | 46.76 |
| Water | 22.39 |
| Tomato Paste | 21.25 |
| 90 Beef | 1.82 |
| TVP | 1.81 |
| Beef Base | 1.61 |
| Dehydrated Onion | 1.42 |
| Worcestershire Sauce | .76 |
| Salt | .57 |
| Granulated Garlic | .49 |
| Basic | .38 |
| Sugar | .38 |
| Oregano | .34 |
| | 100.00 |

PROCEDURE

The beef is ground through a 3/16 inch plate. All of the ingredients, except the tomato paste, Worcestershire sauce, and water are placed in a blender and blending is commenced. When the mixture is well blended, steam is introduced into the mixture. Steam injection is continued until an internal mix temperature of about 150° F. is achieved. Steam injection is then terminated. If the blender lacks a steam jacket, the product is transferred to a steam jacketed mixing vessel. The tomato paste and Worcestershire sauce are added. Mixing is commenced and steam flow through the jacket is commenced. Mixing and heating are continued until an internal temperature of about 180° F. is achieved. Moisture content is determined and adjusted by adding water. The product is cooled to under 140° F. by passage of cold water through the vessel jacket and/or vacuum cooling. The product is pumped to a vacuum packing machine, where it is vacuum packaged and labeled. The packaged product is chilled to below 40° F. and boxed.

PRODUCT IV: Chili

| INGREDIENTS | (% by weight) |
|---|---|
| MDM Chicken | 54.45 |
| Water | 27.23 |
| Tomato Paste | 6.04 |
| Dehydrated Onion | 1.99 |
| 90 Beef | 1.86 |
| TVP | 1.85 |
| Beef Base | 1.45 |
| Chili Powder | 1.21 |
| Paprika | .86 |
| Salt | .78 |
| Flour | .72 |
| Sugar | .43 |
| Cumin | .41 |
| Granulated Garlic | .28 |

-continued

PRODUCT IV: Chili

| INGREDIENTS | (% by weight) |
|---|---|
| Louisiana Hot Sauce | .23 |
| Oregano | .11 |
| Cayenne Pepper | .09 |
| | 100.00 |

PROCEDURE

The beef is ground through a 3/16 inch plate. All of the ingredients, except the tomato paste, Louisiana hot sauce, and water are placed in a blender and mixing is commenced. When the mixture is well blended, steam is introduced into the mixture. Steam injection is continued until an internal mix temperature of about 150° F. is achieved. Steam injection is then terminated. If the blender lacks a steam jacket, the product is transferred to a steam jacketed mixing vessel. The tomato paste and Louisiana hot sauce are added. Mixing is commenced and steam flow through the jacket is commenced. Mixing and heating are continued until an internal temperature of about 180° F. is achieved. Moisture content is determined and adjusted by adding water. The product is cooled to under 140° F. by passage of cold water through the vessel jacket and/or vacuum cooling. The product is pumped to a vacuum packing machine, where it is vacuum packaged and labeled. The packaged product is chilled to below 40° F. and boxed.

PRODUCT V: Carne Guisada

| INGREDIENTS: | (% by weight) |
|---|---|
| MDM Chicken | 51.23 |
| Diced Tomatoes | 20.44 |
| Water | 12.41 |
| Dehydrated Onion | 2.42 |
| Tomato Paste | 2.29 |
| Flour | 2.27 |
| Worcestershire Sauce | 2.02 |
| 90 Beef | 1.75 |
| TVP | 1.74 |
| Salt | .55 |
| Cumin | .32 |
| Dehydrated Jalapeno | .32 |
| Granulated Garlic | .23 |
| Chili Powder | .16 |
| Black Pepper | .12 |
| Oregano | .11 |
| Cayenne Pepper | .06 |
| | 100.00 |

PROCEDURE

The beef is ground through a 3/16 inch plate. All of the ingredients, except the diced tomatoes, tomato paste, Worcestershire sauce, flour, and water are placed in a blender and mixing is commenced. When the mixture is well blended, steam is introduced into the mixture. Steam injection is continued until an internal mix temperature of about 150° F. is achieved. Steam injection is then terminated. If the blender lacks a steam jacket, the product is transferred to a steam jacketed mixing vessel. The diced tomatoes, tomato paste, and Worcestershire sauce are added. Mixing is commenced and steam flow through the jacket is commenced. Mixing and heating are continued until an internal temperature of about 180° F. is achieved. Moisture content is determined and adjusted by adding water. The product is cooled to under 140° F. by passage of cold water through the vessel jacket and/or vacuum cooling. The product is pumped to a vacuum packing machine, where it is vacuum packaged and labeled. The packaged product is chilled to below 40° F. and boxed.

Figure 2:
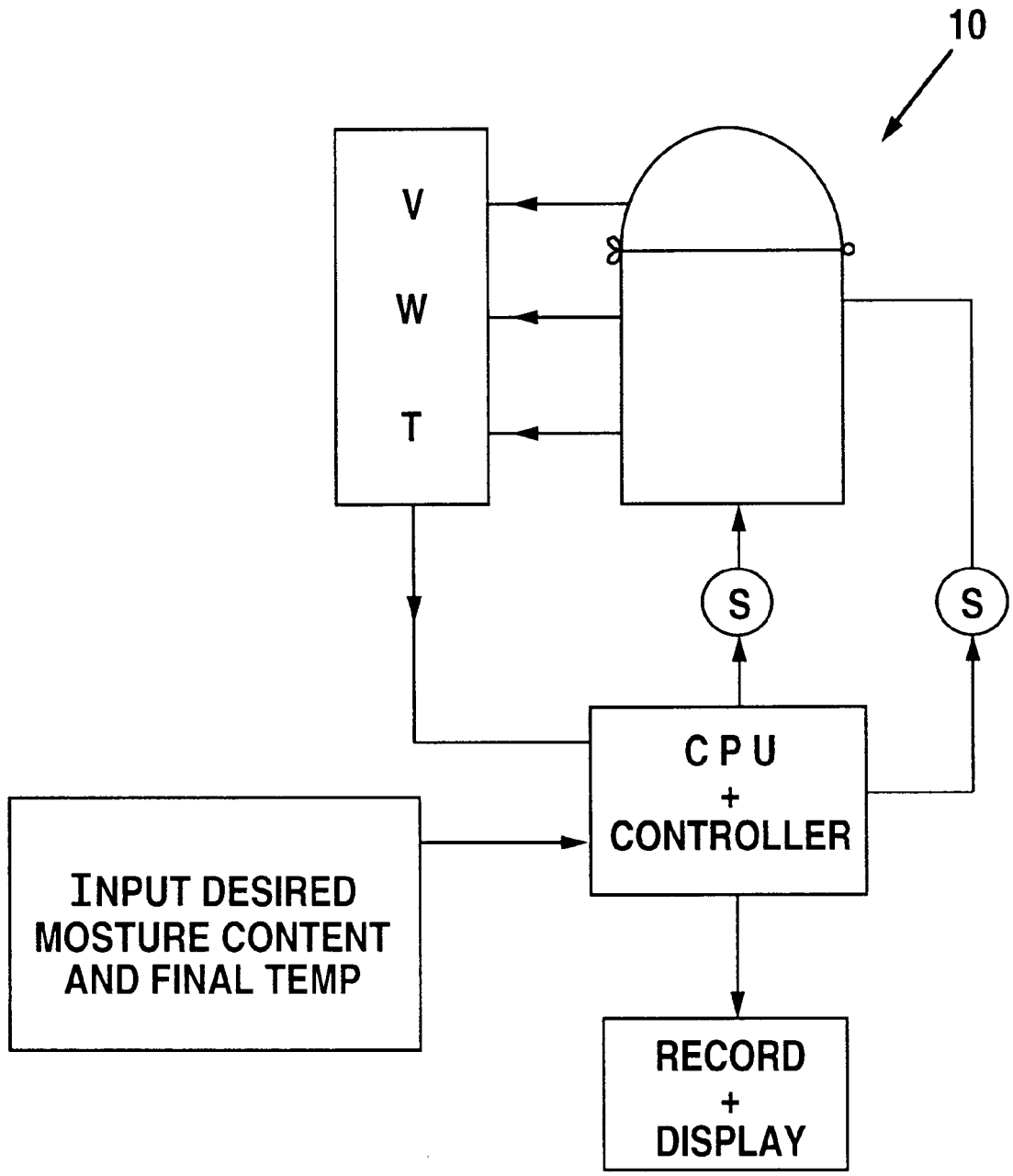
FIG. 2 is a is a diagrammatic view of the preferred embodiment.

FIG. 2 illustrates a schematic of an automated cycle allowing the user to preselect and program a desired moisture content and final product temperature. Typically, one or more sensors would be utilized to continuously or periodically measure vacuum, weight of the product, and temperature of the product. The sensors would generate a signal to a central processing unit (CPU) and controller which has been programmed with a desired input of moisture content and final product temperature. The CPU and controller may also have a recorder and display unit to keep a record of the controlled variables in the input signals as well as an instantaneous display of the vacuum, weight and temperature conditions. The CPU is programmed to controllably activate steam means (S) to control injection of steam through injectors and/or in the jackets of the walls of the tub while also controllably activating pump (P) to control the vacuum drawn on the product. Also, the CPU may control the electric motors to control the rpm of the agitation.

Set forth in Tables III through VI are compositions and procedures utilized in running production-size batches according to applicants' methods and compositions.

Table III sets forth a recipe designated Preblend Batch #1, formulated in 500, 1,000, 1,500, 2,000, 2,500 and 3,000 pound preblended batches. Preblend batches are created by adding mechanically deboned meat (MDM chicken) in the weights indicated along with the designated amounts of 35 beef or head meat and salt, and either mechanically mixing the ingredients together or emulsifying them together. A firmer product results by emulsifying the MDM Chicken and 35 beef or head meat before placing them in the steam cooker. The emulsification is done with salt. Thus, the entire OM preblend is typically emulsified to a batter-like consistency (like hotdog batter).

TABLE IV

TACO FILLING/1,000 POUND BATCH
(PREBLENDED MEAT)
TARE BLENDER SCALE TO ZERO (0) POUNDS

| | FORMULA | | |
|---|---|---|---|
| OM Preblend #1 | 757.3 | or | 806.7 |
| 35 Beef/Head Meat | 49.4 | | 0 |
| Beef Base | 4.5 | | 4.5 |
| Salt | 3.5 | | 3.5 |
| Spices | 128.7 | | 128.7 |
| (180° F. Temperature) | | | |
| Moisture | 56.6 | | 56.6 |
| FINISHED WEIGHT | 1,000.0 | | 1,000.0 |

Table V set forth below indicates the formula utilized for on-site meat mixing (rather than using the preblended that already has the 35 beef/head meat and salt cut in) of taco filling.

TABLE V

TACO FILLING/1,000 POUND BATCH
(ON-SITE MEAT MIXING)
TARE BLENDER SCALE TO ZERO (0) POUNDS

| | FORMULA |
|---|---|
| MDM Chicken | 599.1 |
| 35 Beef/Head Meat | 200.1 |
| Beef Base | 4.5 |
| Salt | 11.0 |
| Spices | 128.7 |
| (180° F. Temperature) | |
| Moisture | 56.6 |
| FINISHED WEIGHT | 1,000.0 |

Table V indicates a finished weight of 1,000 pounds of taco filling would be achieved when mixing according to the formula set forth and following the steps set forth in Checklist No. I below:

TABLE III

PREBLEND #1 BATCH FORMULATION

| | BATCH WEIGHT | | | | | |
|---|---|---|---|---|---|---|
| | LBS. 500.00 | LBS. 1,000.00 | LBS. 1,500.00 | LBS. 2,000.00 | LBS. 2,000.00 | LBS. 3,000.00 |
| MDM Chicken | 399.50 | 799.00 | 1,198.50 | 1,598.00 | 1,997.50 | 2,397.00 |
| 35 Beef/Head Meat (chunks or ground) | 100.50 | 201.00 | 301.50 | 402.00 | 502.50 | 603.00 |
| Salt | 5.00 | 10.00 | 15.00 | 20.00 | 25.00 | 30.00 |

Table IV illustrates the formula utilized for mixing the preblended meat as set forth in Table III in a blender which has been tared to zero pounds. As set forth in Table IV, a 1,000 pound batch of taco filling requires about 757.3 pounds of the preblend set forth according to the formulas in Table III mixed with 49.4 pounds of 35 beef/head meat, 4.5 pounds of beef base, salt, and spices in the proportions indicated for a finished weight of 1,000 pounds of taco filling.

CHECKLIST NO. I

TACO FILLING PRODUCTION
CHECKLIST/PREBLEND OR ON-SITE

☐ Injector Drain Valve Open
☐ Jacket Drain Valve Open
☐ TARE BLENDER TO ZERO (0) POUNDS
☐ Close Blender Discharge Openings
☐ Close Blender Lid -continued

CHECKLIST NO. I

TACO FILLING PRODUCTION
CHECKLIST/PREBLEND OR ON-SITE

Figure 3:
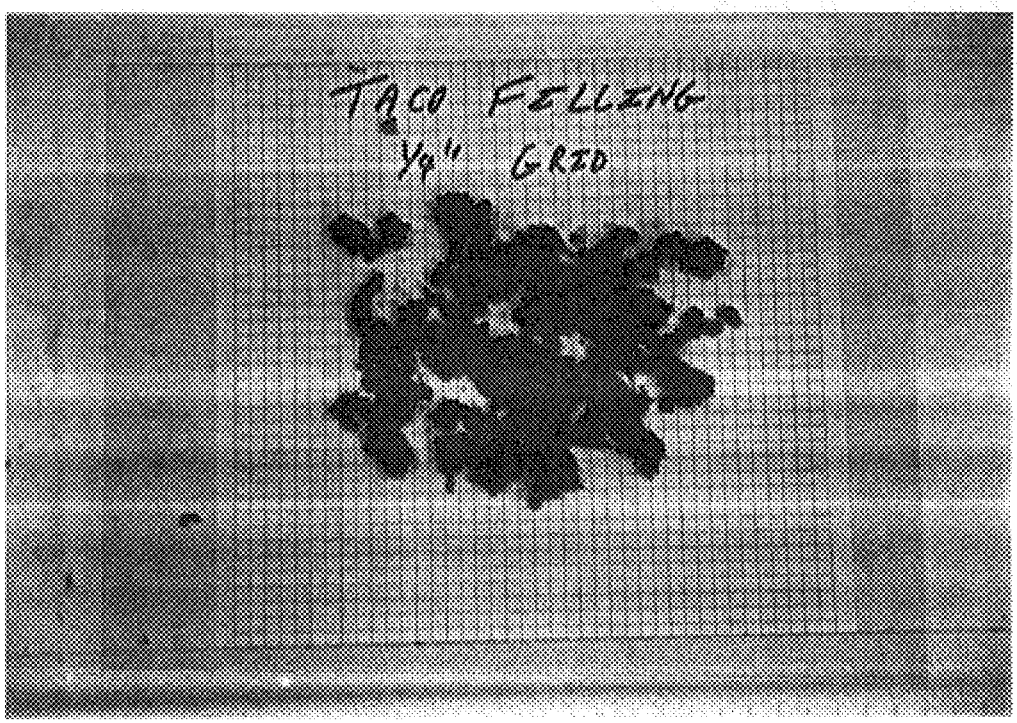
FIG. 3 is a photographic illustration of the taco filling prepared by Applicant's unique method.

☐ Place Preblend Into Vacuum Hopper; Vacuum Pump or otherwise add
  Preblend Into Blender
☐ RECORD SCALE WEIGHT ON BATCH CONTROL SHEET
☐ Open Blender Lid
☐ Add BEEF BASE according to recipe
☐ RECORD SCALE WEIGHT ON BATCH CONTROL SHEET
☐ Add SALT (according to recipe)
☐ RECORD SCALE WEIGHT ON BATCH CONTROL SHEET
☐ Add SPICE BAGS
☐ RECORD SCALE WEIGHT ON BATCH CONTROL SHEET
☐ Turn Blender Onto High Speed Blend (20–25 rpm); Blend Ingredients Completely
☐ Turn Blender Speed to 2.5 On Blender Speed Control (about 4 rpm)
☐ Close Blender Lid
☐ Open Steam Valve To Injectors
☐ Close Injector Drain Valve When Dry Steam Flows Out
☐ Cut Off Steam Valve to Injectors When Temperature Reaches 150° F.
☐ Open Steam Valve To Jacket
☐ Close Jacket Drain Valve When Dry Steam Flows Out
☐ Open Injector Drain Valve
☐ When Temperature Reaches 180° F., RECORD SCALE WEIGHT
  ON BATCH CONTROL SHEET
☐ Turn On Vacuum Pump
☐ Close Vacuum Bleed Valve Until Weight Drop Starts On Scale
☐ Cut Off Vacuum Pump When Blender Scale Indicates 1,000 Pounds
☐ Cut Off Steam Valve to Jacket
☐ Open Jacket Drain Valve
☐ Discharge Product Into Packaging Hopper This process results in irregular-shaped, texturized particles between about ⅛" and ¾" (long axis) as set forth in FIG. 3.

Table VI indicates the formula utilized to make 1,000 pounds of chili using the preblended meat set forth in Table I.

TABLE VI

CHILI/1,000 POUND BATCH
(PREBLENDED MEAT)
TARE BLENDER SCALE TO ZERO (0) POUNDS

| | FORMULA |
|---|---|
| OM Preblend #1 | 549.7 |
| Beef Base | 16.0 |
| Salt | 2.0 |
| Spices | 72.8 |
| (150° F. Temperature) | |
| Tomato Blend | 69.8 |
| (180° F. Temperature) | |
| Masa Blend | 103.7 |
| Moisture | 186.0 |
| FINISHED WEIGHT | 1,000.0 |

For on-site meat mixing, in preparing a 1,000 pound batch of chili according to applicants' method, the formula set forth in Table VII below is utilized. Preblend may be adjusted downward and moisture content increased to get 1,000.0 lbs.

TABLE VII

CHILI/1,000 POUND BATCH
(ON-SITE MEAT)
TARE BLENDER SCALE TO ZERO (0) POUNDS

| | FORMULA |
|---|---|
| MDM Chicken | 434.9 |
| 35 Beef/Head Meat | 109.4 |
| Beef Base | 16.0 |
| Salt | 7.4 |
| Spices | 72.8 |
| (150° F. Temperature) | |
| Tomato Blend | 69.8 |
| (180° F. Temperature) | |
| Masa Blend | 103.7 |
| Moisture | 186.0 |
| FINISHED WEIGHT | 1,000.0 |

The tomato blend utilized in the 1,000 pound batch of chili is approximately 66.7 pounds of tomato paste (28% solids) and 2.6 pounds of a selected hot sauce. The masa blend utilized in the 1,000 pound batch of chili is approximately 23.7 pounds of masa mixed with 80.0 pounds of water. Checklist No. II set forth below lists the steps utilized in preparing the chili batches according to applicants' present invention.

CHECKLIST NO. II
CHILI PRODUCTION CHECKLIST/PREBLEND OR ON-SITE

Figure 4:
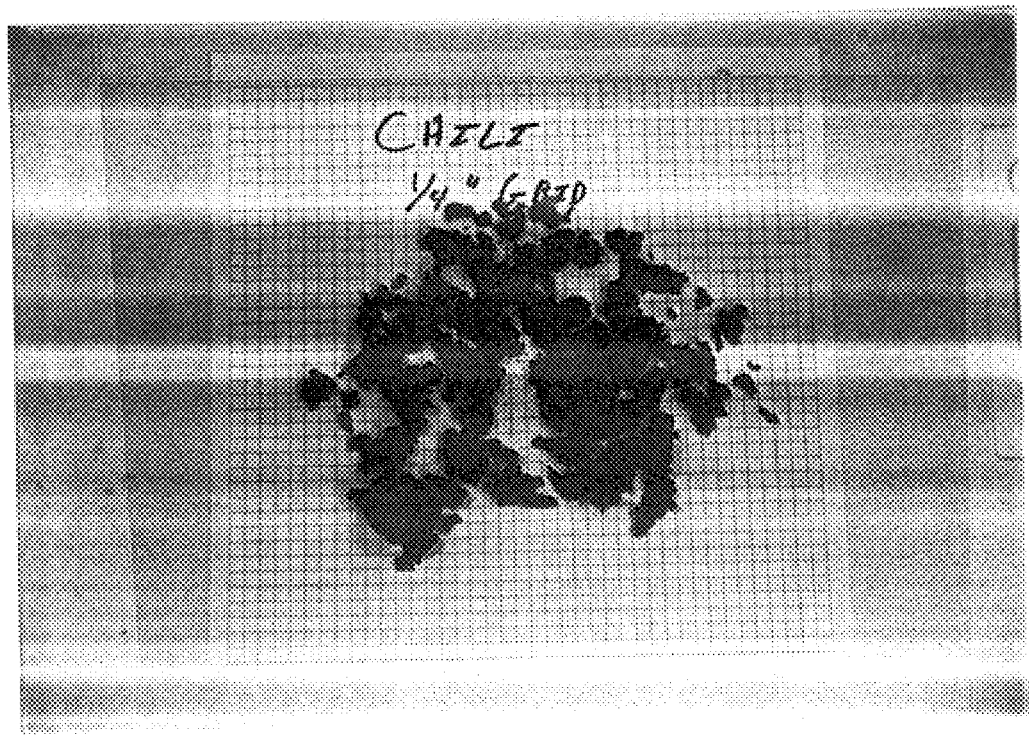
FIG. 4 is a photographic illustration of the chili prepared by Applicant's unique method.

☐ Injector Drain Valve Open
☐ Jacket Drain Valve Open
☐ TARE BLENDER TO ZERO (0) POUNDS
☐ Close Blender Discharge Openings
☐ Close Blender Lid
☐ Add Meat Blend Into Vacuum Hopper; Vacuum Pump Meat Into Blender
☐ RECORD SCALE WEIGHT ON BATCH CONTROL SHEET
☐ Open Blender Lid
☐ Add BEEF BASE
☐ RECORD SCALE WEIGHT ON BATCH CONTROL SHEET
☐ Add SALT
☐ RECORD SCALE WEIGHT ON BATCH CONTROL SHEET
☐ Add SPICE BAGS
☐ RECORD SCALE WEIGHT ON BATCH CONTROL SHEET
☐ Turn Blender Onto High Speed Blend (about 8–10 rpm); Blend Ingredients Completely
☐ Turn Blender Speed to 2.0 On Blender Speed Control
☐ Close Blender Lid
☐ Open Steam Valve To Injectors
☐ Close Injector Drain Valve When Dry Steam Flows Out
☐ Cut off Steam Valve to Injectors When Temperature Reaches 150° F.
☐ Open Blender Lid
☐ RECORD SCALE WEIGHT ON BATCH CONTROL SHEET
☐ Add Tomato Blend; RECORD SCALE WEIGHT ON BATCH CONTROL SHEET
☐ Open Steam Valve To Injectors
☐ Open Steam Valve to Jacket
☐ Close Jacket and Injector Drain Valves When Dry Steam Flows Out
☐ Cut Off BOTH Steam Valve To Injectors and Steam Valve To Jacket When Temperature Reaches 180° F.
☐ RECORD SCALE WEIGHT ON BATCH CONTROL SHEET
☐ Add Masa Mix
☐ RECORD SCALE WEIGHT ON BATCH CONTROL SHEET
☐ * Add Water Until 1,000 Pounds Is Indicated On Blender Scale
☐ Open Injector Drain Valve
☐ Open Jacket Drain Valve
☐ Discharge Product Into Packaging Hopper This process results in irregular-shaped texturized particles between ⅛" and 1" (long axis) as set forth in FIG. 4. *A vacuum may be applied if cooling is desired and more than 1,000 pounds will be totaled to account for moisture lost in cooling.

Table VIII indicates a formula followed for preparing a 1,000 pound batch of carne guisada utilizing on-site meat mixing.

TABLE VIII

CARNE GUISADA/1,000 POUND BATCH
(ON-SITE MEAT MIXING)
TARE BLENDER SCALE TO ZERO (0) POUNDS

|  | FORMULA |
|---|---|
| MDM Chicken | 423.4 |
| 35 Beef/Head Meat | 106.5 |
| Beef Base | 15.5 |
| Salt | 5.5 |
| Spices | 54.8 |
| (150° F. Temperature) | |
| Tomato Blend | 247.5 |
| (180° F. Temperature) | |
| Masa Blend | 103.7 |
| Moisture | 43.1 |
| FINISHED WEIGHT | 1,000.0 |

Table IX sets forth a formula to follow when utilizing preblended meat to produce a 1,000 pound batch of carne guisada according to applicants' present invention.

TABLE IX

CARNE GUISADA/1,000 POUND BATCH
(PREBLENDED MEAT)
TARE BLENDER SCALE TO ZERO (0) POUNDS

|  | FORMULA |
|---|---|
| OM Preblend #1 | 535.2 |
| Beef Base | 15.5 |
| Salt | .2 |
| Spices | 54.8 |
| (150° F. Temperature) | |
| Tomato Blend | 247.5 |
| (180° F. Temperature) | |
| Masa Blend | 103.7 |
| Moisture | 43.1 |
| FINISHED WEIGHT | 1,000.0 |

It should be noted that the tomato blend utilized with the carne guisada (1,000 pound batch) includes: 204.4 pounds of diced tomato, 22.9 pounds of tomato paste (28% solids), and an appropriate spice sauce of about 20.2 pounds. The masa blend is the same formulation as that set forth above.

Checklist No. III set forth below indicates the production steps to be followed when preparing carne guisada according to applicants' present method.

CHECKLIST NO. III
CARNE GUISADA PRODUCTION CHECKLIST

☐ Injector Drain Valve Open
☐ Jacket Drain Valve Open
☐ TARE BLENDER TO ZERO (0) POUNDS
☐ Close Blender Discharge Openings
☐ Close Blender Lid
☐ Add Meat Blend Into Vacuum Hopper; Vacuum Pump Meat Into Blender
☐ RECORD SCALE WEIGHT ON BATCH CONTROL SHEET
☐ Open Blender Lid
☐ Add BEEF BASE
☐ RECORD SCALE WEIGHT ON BATCH CONTROL SHEET
☐ Add SALT
☐ RECORD SCALE WEIGHT ON BATCH CONTROL SHEET
☐ Add SPICE BAGS -continued

CHECKLIST NO. III
CARNE GUISADA PRODUCTION CHECKLIST

Figure 5:
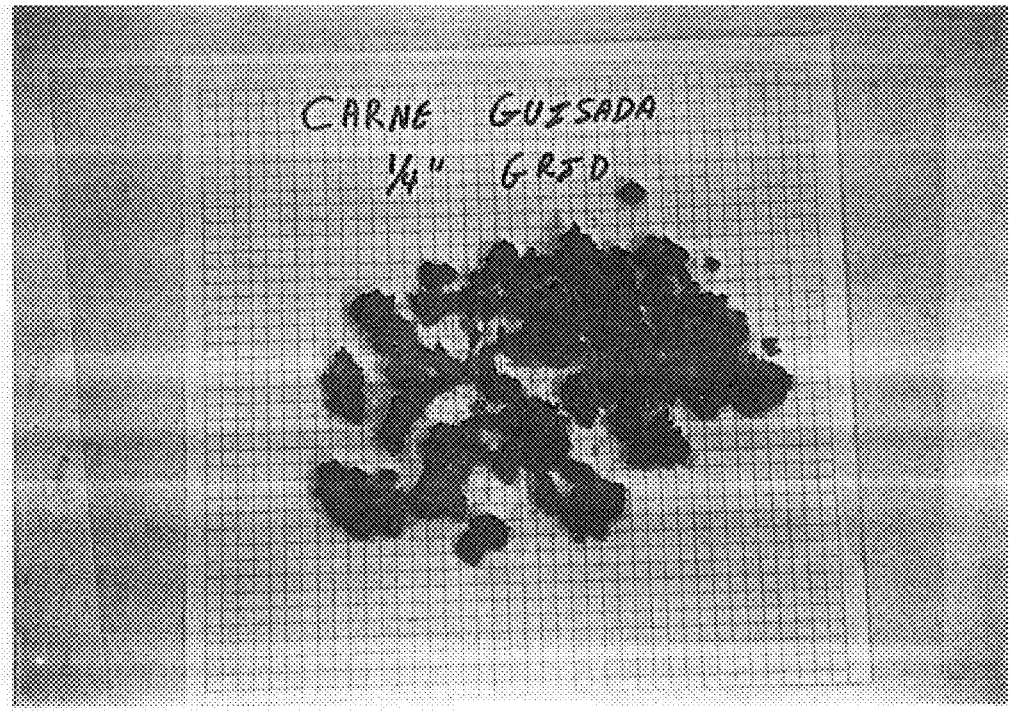
FIG. 5 is a photographic illustration of the carne guisada prepared by Applicant's unique method.

☐ RECORD SCALE WEIGHT ON BATCH CONTROL SHEET
☐ Turn Blender Onto High Speed Blend (about 6 rpm); Blend Completely
☐ Turn Blender Speed to 2.0 On Blender Speed Control
☐ Close Blender Lid
☐ Open Steam Valve To Injectors
☐ Close Injector Drain Valve When Dry Steam Flows Out
☐ Cut off Steam Valve to Injectors When Temperature Reaches 150° F.
☐ Open Blender Lid
☐ RECORD SCALE WEIGHT ON BATCH CONTROL SHEET
☐ Add Tomato Blend; RECORD SCALE WEIGHT ON BATCH CONTROL SHEET
☐ Open Steam Valve To Injectors
☐ Open Steam Valve to Jacket
☐ Close Jacket and Injector Drain Valves When Dry Steam Flows Out
☐ Cut Off BOTH Steam Valve To Injectors and Steam Valve To Jacket When Temperature Reaches 180° F.
☐ RECORD SCALE WEIGHT ON BATCH CONTROL SHEET
☐ Add Masa Mix
☐ RECORD SCALE WEIGHT ON BATCH CONTROL SHEET
******* IF WEIGHT IS LESS THAN 1,000 POUNDS ********
☐ Add Water Until 1,000 Pounds Is Indicated On Blender Scale
☐ Open Injector Drain Valve
☐ Open Jacket Drain Valve
☐ Discharge Product Into Packaging Hopper
******* IF WEIGHT IS MORE THAN 1,000 POUNDS *******
☐ Open Steam Valve to Jacket
☐ Turn On Vacuum Pump
☐ Close Vacuum Bleed Valve Until Weight Drop Starts On Scale
☐ Cut Off Vacuum Pump When Blender Scale Indicates 1,000 Pounds
☐ Cut Off Steam Valve To Jacket
☐ Open Injector Drain Valve
☐ Open Jacket Drain Valve
☐ Discharge Product Into Packaging Hopper This process results in irregular-shaped, texturized particles between ⅔" and 1-⅓" (long axis) as set forth in FIG. 5.

Table X indicates a formula followed for preparing a 1,000 pound batch of picadillo according to applicants' present method using on-site meat mixing.

Table XI indicates a formula followed to produce a 1,000 pound batch of picadillo utilizing on-site meat mixing.

TABLE X

PICADILLO/1,000 POUND BATCH
(ON-SITE MEAT MIXING)
TARE BLENDER SCALE TO ZERO (0) POUNDS

|  | FORMULA |
|---|---|
| MDM Chicken | 370.9 |
| 35 Beef/Head Meat | 93.3 |
| Beef Base | 8.5 |
| Salt | 6.4 |
| Spices | 94.9 |
| (150° F. Temperature) | |
| Tomato Blend | 317.3 |
| (180° F. Temperature) | |
| FINISHED WEIGHT | 1,000.0 |

The tomato blend for the picadillo includes 308.2 pounds of diced tomato, 3.5 pounds of tomato paste (28% solids), and 5.6 pounds of vinegar.

Table XI sets forth the preblend recipe for picadillo (1,000 batch).

TABLE XI

PICADILLO/1,000 POUND BATCH
(PREBLENDED MEAT)
TARE BLENDER SCALE TO ZERO (0) POUNDS

|  | FORMULA |
|---|---|
| OM Preblend #1 | 468.8 |
| Beef Base | 8.5 |
| Salt | 1.8 |
| Spices (150° F. Temperature) | 94.9 |
| Tomato Blend (180° F. Temperature) | 317.3 |
| Moisture | 108.7 |
| FINISHED WEIGHT | 1,000.0 |

Checklist No. IV set forth below indicates the production steps utilized in preparing picadillo according to applicants' method.

CHECKLIST NO. IV
PICADILLO PRODUCTION CHECKLIST

☐ Injector Drain Valve Open
☐ Jacket Drain Valve Open
☐ TARE BLENDER TO ZERO (0) POUNDS
☐ Close Blender Discharge Openings
☐ Close Blender Lid
☐ Add Meat Blend Into Vacuum Hopper; Vacuum Pump Meat Into Blender
☐ RECORD SCALE WEIGHT ON BATCH CONTROL SHEET
☐ Open Blender Lid
☐ Add BEEF BASE
☐ RECORD SCALE WEIGHT ON BATCH CONTROL SHEET
☐ Add SALT
☐ RECORD SCALE WEIGHT ON BATCH CONTROL SHEET
☐ Add SPICE BAGS
☐ RECORD SCALE WEIGHT ON BATCH CONTROL SHEET
☐ Turn Blender Onto High Speed Blend (about 6 rpm); Blend Ingredients Completely
☐ Turn Blender Speed to 2.0 On Blender Speed Control
☐ Close Blender Lid
☐ Open Steam Valve To Injectors
☐ Close Injector Drain Valve When Dry Steam Flows Out
☐ Cut off Steam Valve to Injectors When Temperature Reaches 150° F.
☐ Open Blender Lid
☐ RECORD SCALE WEIGHT ON BATCH CONTROL SHEET
☐ Add Tomato Blend; RECORD SCALE WEIGHT ON BATCH CONTROL SHEET
☐ Open Steam Valve To Injectors
☐ Open Steam Valve to Jacket
☐ Close Jacket and Injector Drain Valves When Dry Steam Flows Out
☐ Cut Off BOTH Steam Valve To Injectors and Steam Valve To Jacket When Temperature Reaches 180° F.
☐ RECORD SCALE WEIGHT ON BATCH CONTROL SHEET
******** IF WEIGHT IS LESS THAN 1,000 POUNDS ********
☐ Add Water Until 1,000 Pounds Is Indicated On Blender Scale
☐ Open Injector Drain Valve
☐ Open Jacket Drain Valve
☐ Discharge Product Into Packaging Hopper
******** IF WEIGHT IS MORE THAN 1,000 POUNDS ********
☐ Open Steam Valve to Jacket
☐ Turn On Vacuum Pump
☐ Close Vacuum Bleed Valve Until Weight Drop Starts On Scale
☐ Cut Off Vacuum Pump When Blender Scale Indicates 1,000 Pounds
☐ Cut Off Steam Valve To Jacket
☐ Open Injector Drain Valve
☐ Open Jacket Drain Valve
☐ Discharge Product Into Packaging Hopper This process results in irregular-shaped texturized particles between 1/3" and 1-1/3" (long axis).

For applicants' precooked chorizo, a different preblend is utilized (Preblend #2). This preblend is mixed in proportions yielding a total of 773.4 pounds of precooked chorizo. This is made up of about 612.4 pounds of MDM (mechanical deboned meat) chicken, 153.1 pounds of pork jowls, and 7.65 pounds of salt. This preblend is utilized according to Table XII to produce a 1,000 pound batch of precooked chorizo.

TABLE XII

PRECOOKED CHORIZO/1,000 POUND BATCH
BATCH CONTROL SHEET/PREBLENDED MEAT
TARE BLENDER SCALE TO ZERO (0) POUNDS

|  | FORMULA |
|---|---|
| OM Preblend #1 | 773.4 |
| Pork or Ham Base | 4.7 |
| Salt | 9.0 |
| Spices (150° F. Temperature) | 117.8 |
| Vinegar 100G | 32.4 |
| FINISHED WEIGHT | 1,000.0 |

The precooked chorizo production Checklist No. V is set forth below:

CHECKLIST NO. V
PRECOOKED CHORIZO PRODUCTION CHECKLIST

Figure 6:
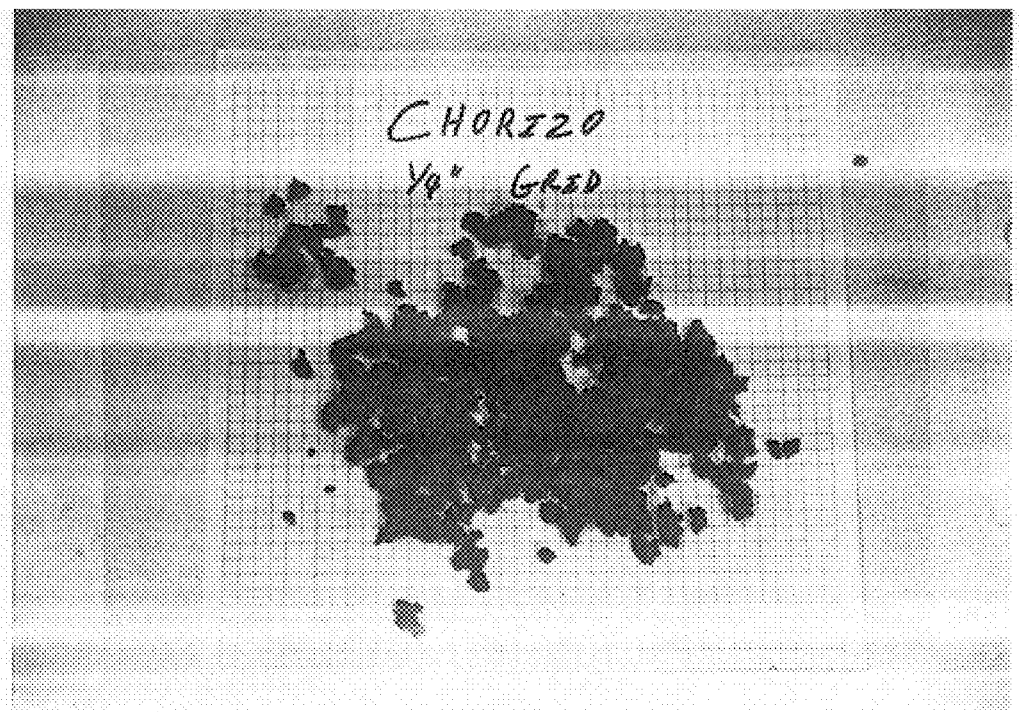
FIG. 6 is a photographic illustration of the chorizo prepared by Applicant's unique method.

☐ Injector Drain Valve Open
☐ Jacket Drain Valve Open
☐ TARE BLENDER TO ZERO (0) POUNDS
☐ Close Blender Discharge Openings
☐ Close Blender Lid
☐ Add Meat Blend Into Vacuum Hopper; Vacuum Pump Meat Into Blender
☐ RECORD SCALE WEIGHT ON BATCH CONTROL SHEET
☐ Open Blender Lid
☐ Add PORK BASE
☐ RECORD SCALE WEIGHT ON BATCH CONTROL SHEET
☐ Add SALT
☐ RECORD SCALE WEIGHT ON BATCH CONTROL SHEET
☐ Add SPICE BAGS
☐ RECORD SCALE WEIGHT ON BATCH CONTROL SHEET
☐ Turn Blender Onto High Speed Blend (about 6 rpm); Blend Ingredients Completely
☐ Turn Blender Speed to 2.5 On Blender Speed Control
☐ Close Blender Lid
☐ Open Steam Valve To Injectors
☐ Close Injector Drain Valve When Dry Steam Flows Out
☐ Cut Off Steam Valve to Injectors When Temperature Reaches 150° F.
☐ Open Blender Lid
☐ RECORD SCALE WEIGHT ON BATCH CONTROL SHEET
☐ Add Vinegar; RECORD SCALE WEIGHT ON BATCH CONTROL SHEET
☐ Open Steam Valve To Injectors
☐ Close Jacket Drain Valve When Dry Steam Flows Out
☐ Cut Off Steam Valve To Jacket When Temperature Reaches 180° F.
☐ RECORD SCALE WEIGHT ON BATCH CONTROL SHEET
******** IF WEIGHT IS LESS THAN 1,000 POUNDS ********
☐ Add Water Until 1,000 Pounds Is Indicated On Blender Scale
☐ Open Injector Drain Valve
☐ Open Jacket Drain Valve
☐ Discharge Product Into Packaging Hopper
******** IF WEIGHT IS MORE THAN 1,000 POUNDS ********
☐ Open Steam Valve to Jacket
☐ Turn On Vacuum Pump
☐ Close Vacuum Bleed Valve Until Weight Drop Starts On Scale
☐ Cut Off Vacuum Pump When Blender Scale Indicates 1,000 Pounds
☐ Cut Off Steam Valve To Jacket
☐ Open Injector Drain Valve
☐ Open Jacket Drain Valve
☐ Discharge Product Into Packaging Hopper This process results in irregular-shaped, texturized particles between ½ inch and 1 inch (long axis) as set forth in FIG. 6.

Thus, it is noted above that OM Preblend No. 1 is used for taco filling, chili, carne guisada, and picadillo. The MDM utilized is chicken cut with 35 beef/head meat (35% lean beef) or, in the alternative, 50 beef (50% lean beef).

Typically, the preblend is run through an emulsifier to improve the blend and reduce the beef particle size.

Two blenders have been used. These include a 2,000 pound blender (a modified Reitz) which was jacketed for bottom steam injection and supplied with an inverter variable speed motor. It is also modified to have auto reverse and reinforced to pull a vacuum. Also, a vacuum lid was used. In addition, a 3,000 pound blender was built to spec by BlendTech of San Jose, Calif. This also includes an auto reverse and a sanitary steam package.

Applicants typically use vacuum to reduce water on the taco filling (water reduced to a range of about 58% to 65%, normally about 60%). Pizza topping is also being prepared utilizing a vacuum to reduce the water to a range of 50% to 58%. Moisture content of finished chili is 70% to 72%, chorizo is 58% to 65%, and picadillo is 65% to 70%.

Chorizo, picadillo, and carne guisada mixes may require either adding water to reach the appropriate moisture content or drawing a vacuum to pull moisture off. This will frequently depend upon the moisture content of the particular steam utilized for injection purposes. Steam with a high moisture content may require drawing a vacuum off the end to reduce water content. The dryer steam may require the addition of water at the end to adjust for moisture content.

By varying the rotational speed of the ribbon during the steam injection, the size of the resulting particles can be controlled. Faster will result in smaller pieces and slower will give larger pieces, all other variables the same.

The system may, of course, be manually controlled with operator-controlled steam injection while reading the appropriate vacuum and temperature gauges and either removing samples of the product from time to time to have the lab determine moisture content, or reading a scale to reach a preselected weight which will provide the preselected, final moisture content of the final product.

Other variations in the method include shutting off steam injectors when the product reaches a preselected temperature, typically 150° F., but to continue heating the product to an upper temperature, typically at or above 180° F. utilizing injection of steam in the jacket. An advantage of this variation is that, by shutting down heat through steam injection, addition of moisture to the product is avoided. Sometimes, however, more moisture is desired in the product. When more moisture is desired, the step of controlled cooling while simultaneously drawing a vacuum on the product may not be necessary.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A method of texturizing a paste-like, moisture carrying, protein in product comprised of the steps of:
   providing an apparatus having a tub portion and lid portion sealable to the tub portion and a blender means comprising at least two shaft driven screws and at least one steam injector in the tub portion; the apparatus including means for generating steam to the steam injector and means for energizing the blender means;
   putting the moisture carrying product in to the vessel;
   heating said moisture carrying product by injecting into said product steam from said steam injector while blending until said untexturized protein product becomes texturized; and
   adjusting the speed and blenders of the screws of the apparatus, depending upon the desired texture of the product.

2. The method of claim 1 wherein the protein product of said putting step includes at least one of the following: comminuted chicken, comminuted pork, or comminuted beef.

3. Method of claim 1 further including the step of controlling the moisture content of the protein product.

4. Method of claim 1 wherein the putting step includes the step of putting the ingredients in the tub.

5. Method of claim 4 wherein the other ingredients of the putting step include one or more of the following:
   a) diced tomatoes;
   b) dehydrated potato;
   c) dehydrated onion;
   d) texturized vegetable protein; or
   e) tomato paste.

6. The method as set forth in claim 1, wherein the putting step includes the step of putting sufficient product into the tub to completely cover the at least one injector of the tub.

7. The method of claim 1 further including the step of:
   d) adjusting the speed of the blender means dependent upon the desired texture of the product.

8. The method of claim 1 wherein the adjusting step includes the step of reversing the direction of the blender means.

9. The method of claim 3 wherein the providing step includes the step of providing a jacketed vessel with means for drawing a vacuum in the vessel and wherein the moisture content is controlled by drawing a vacuum in the vessel.

10. The step of claim 3 where the moisture content is controlled by controlled heating of the vessel.

11. The method of claim 3 where the moisture content is controlled by adding water to the protein product or removing water therefrom.

12. The method of claim 1 wherein the putting step includes the step of putting sufficient product into the tub to completely cover the at least one injector of the tub.

13. The method of claim 1 wherein the putting step includes the step of putting other ingredients into the tub.

14. The method of claim 13 wherein the other ingredients of the putting step include one or more of the following:
   a) diced tomatoes;
   b) dehydrated potato;
   c) dehydrated onion;
   d) texturized vegetable protein; or
   e) tomato paste.

15. The method of claim 13 further including, following the putting step, but before the heating step, the step of premixing the moisture-carrying protein product with the other ingredients.

16. The method of claim 1 wherein the blender means is variable between zero and thirty five rpm.

17. The method of claim 1 further including, in the putting step, the step of adding particulate matter to the protein product.

18. The method of claim 1 wherein the blender means of the providing step includes a pair of ribbon screw blenders and wherein the adjusting step includes adjusting the rotational velocity of the pair of ribbon screw blenders.

* * * * *